(12) United States Patent
Mohrschladt et al.

(10) Patent No.: US 6,569,988 B1
(45) Date of Patent: May 27, 2003

(54) METHOD FOR THE PRODUCTION OF POLYAMIDES

(75) Inventors: Ralf Mohrschladt, Schwetzingen (DE); Volker Hildebrandt, Mannheim (DE); Dieter Krauss, Grünstadt (DE); Martin Leemann, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/979,123

(22) PCT Filed: May 23, 2000

(86) PCT No.: PCT/EP00/04698

§ 371 (c)(1), (2), (4) Date: Nov. 19, 2001

(87) PCT Pub. No.: WO00/71599

PCT Pub. Date: Nov. 30, 2000

(30) Foreign Application Priority Data

May 25, 1999 (DE) .......................... 199 23 894

(51) Int. Cl.⁷ .................. C08G 69/00; C08G 69/04; C08G 69/28
(52) U.S. Cl. .................. 528/310; 528/323; 528/324; 528/312; 528/315; 528/320; 528/332; 528/335; 528/336
(58) Field of Search .................. 528/310, 312, 528/323, 315, 324, 335, 336, 320, 332

(56) References Cited

U.S. PATENT DOCUMENTS

| | | | |
|---|---|---|---|
| 5,151,543 A | | 9/1992 | Ziemecki |
| 5,185,427 A | | 2/1993 | Marks ...................... 528/329.1 |
| 6,048,997 A | | 4/2000 | Fischer et al. ............... 558/452 |
| 6,075,117 A | * | 6/2000 | Hayes et al. ................. 528/332 |
| 6,147,208 A | * | 11/2000 | Achhammer et al. ........ 540/538 |
| 6,207,851 B1 | | 3/2001 | Luyken et al. .............. 558/459 |
| 6,222,059 B1 | | 4/2001 | Ebel et al. ................... 558/459 |
| 6,255,521 B1 | | 7/2001 | Voit et al. ................... 558/459 |
| 6,288,207 B1 | * | 9/2001 | Mohrschladt et al. ....... 528/310 |
| 6,310,173 B1 | * | 10/2001 | Mohrschladt et al. ....... 528/310 |
| 6,358,373 B1 | * | 3/2002 | Leemann et al. ............. 203/29 |

FOREIGN PATENT DOCUMENTS

| | | |
|---|---|---|
| DE | 43 18 134 | 12/1994 |
| DE | 196 31521 | 2/1998 |
| DE | 196 36766 | 3/1998 |
| DE | 196 36767 | 3/1998 |
| DE | 197 09390 | 9/1998 |
| DE | 197 42221 | 3/1999 |
| EP | 277 866 | 7/1987 |

OTHER PUBLICATIONS

DE 4319134—Abstract.

* cited by examiner

*Primary Examiner*—P. Hampton-Hightower
(74) *Attorney, Agent, or Firm*—Keil & Weinkauf

(57) ABSTRACT

In a process for producing polyamides, a mixture comprising hexamethylenediamine and aminocapronitrile and obtained from the hydrogenation of adiponitrile is reacted with water and a dicarboxylic acid.

7 Claims, No Drawings

METHOD FOR THE PRODUCTION OF POLYAMIDES

This invention relates to a process for producing polyamides from hexamethylenediamine, aminocapronitrile and a dicarboxylic acid.

The hydrogenation of adiponitrile in the presence of catalysts has been extensively described. For instance, DE-A-196 31 521 describes the catalytic hydrogenation of pentenenitrile in the presence of carbon monoxide. The resulting mixtures of 6-aminocapronitrile and hexamethylenediamine, after their separation, may be further converted to produce nylon 6 and nylon 66. DE-A-43 19 134, for example, discloses a process whereby aminocaproic acid can be reacted in the presence of heterogeneous catalysts to form caprolactam, which in turn is used as monomer for producing nylon 6. Hexamethylenediamine and also adipic acid are also monomeric building blocks for nylon 66.

Another possibility is the direct hydrolytic polymerization of aminocapronitrile, in which case aminocapronitrile may be reacted with water in the presence of catalysts, cf. DE-A-197 09 390.

The disadvantage with existing processes for producing nylon 6 and nylon 66 from aminocapronitrile and hexamethylenediamine is the fact that, after the hydrogenation, the two components have to be used separately in the respective polymerizations. In addition, the monomers have to be of high purity, which generally necessitates an energy- and cost-intensive separation.

It an object of the present invention to provide a process for producing polyamides by using adiponitrile hydrogenation products in a convenient polymerization, not involving a separation after the hydrogenation.

We have found that this object is achieved according to the invention by a process for producing polyamides, which comprises reacting a mixture comprising hexamethylenediamine and aminocapronitrile and obtained from the hydrogenation of adiponitrile with water and a dicarboxylic acid. Preferably, the hydrogenation mixture used comes directly from the hydrogenation stage and has not been subjected to any further purification. The process provides polyamides based on aminonitriles, adipic acid and hexamethylenediamine.

A hydrogenation mixture of 6-aminocapronitrile and hexamethylenediamine can be converted into polyamide mixtures by reacting it in the presence of bifunctional acids such as adipic acid or terephthalic acid in a plurality of steps or stages which are characterized by certain temperatures and pressures.

A multiplicity of hydrogenation mixtures can be used. According to the invention, the molar ratio of 6-aminocapronitrile and hexamethylenediamine in the hydrogenation mixture is preferably in the range from 1:99 to 99:1, preferably from 5:95 to 95:5, particularly preferably from 10:90 to 90:10. The aminocapronitrile-hexamethylenediamine mixture is customarily obtained by hydrogenating adiponitrile according to known processes as described for example in DE-A 836,938, DE-A 848,654 or U.S. Pat. No. 5,151,543. It is also possible to use mixtures of various aminonitriles and diamines.

If desired, the reaction mixture may have added to it, at every reaction stage of the process according to the invention, chain-extending, -branching and -regulating substances known to one skilled in the art, for example mono-, bi- and trifunctional compounds, UV and heat stabilizers, pigments, processing aids, flame retardants, dyes or impact modifiers, as described for example in DE-A-197 09 390.

Chain-extending, -branching and -regulating substances are preferably added to the reaction mixture before, during or after the first reaction stage, whereas pigments, processing aids and dyes are preferably added to the mixture after the stages which include catalyst fixed beds.

According to the invention, the hydrogenation mixture can be converted into polyamide together with water and at least one bifunctional acid in various embodiments of the process. According to the invention, the sequence of steps described hereinbelow takes place either batchwise, i.e., in succession in a single reactor, or continuously, i.e., in successive reactors. It is also possible to carry out some of the steps continuously and the rest batchwise.

A preferred process comprises the steps of:
(1) mixing of the hydrogenation mixture of hexamethylenediamine and aminocapronitrile with water and a dicarboxylic acid to form a reaction mixture and subsequent conversion at a temperature in the range from 90 to 300° C. and a pressure at which the reaction mixture constitutes a single liquid phase,
(2) further conversion of the conversion mixture of step (1) at a temperature in the range from 230 to 400° C. and a pressure at which a liquid and a gaseous phase are obtained, separation of the gaseous phase from the liquid phase, and
(3) postcondensation of the product mixture at a temperature of from 250 to 310° C. and a pressure which is lower than the pressure in step (2).

The steps will now be described in more detail.

(1) The hydrogenation mixture is completely mixed with a bifunctional acid, preferably with adipic acid, and water, for example with the aid of static mixers or in a stirred tank which may also serve as a feed vessel. The acid content is determined as a function of the hexamethylenediamine concentration and is preferably from 50 to 150 mol %, particularly preferably from 90 to 110 mol %, based on the molar amount of hexamethylenediamine used. According to the invention, water is used in a molar ratio of aminocapronitrile to water in the range from 1:1 to 1:6, preferably from 1:1 to 1:4, most preferably from 1:1 to 1:3, preference being given to using water in excess, based on the aminocapronitrile present in the hydrogenation mixture.

The conversion of the reaction mixture takes place at temperatures in the range from 90 to 300° C., preferably from 150 to 230° C. The pressure in this reaction step is preferably selected so that the mixture constitutes a single liquid phase. The reactor used may for example be a flow tube. The residence time in this reaction stage is up to 10 hours, preferably from 0.1 to 3 hours, particularly preferably from 0.1 to 1 hour.

(2) Further conversion of the conversion mixture of step 1 at a temperature in the range from 230 to 400° C., preferably from 250 to 280° C., at such a pressure that a liquid phase and a gaseous phase are obtained and the gaseous phase can be separated from the liquid phase. The residence time in this reaction stage depends on the water content of the mixture, on the reaction temperature and the reactor pressure and on the degree of polymerization desired for the product at the end of the reaction time. It is up to 10 hours, preferably in the range from 0.1 to 5 hours, particularly preferably from 0.1 to 3 hours.

The removal of the gas phase may be effected by the use of stirred or unstirred separating tanks or tank batteries and by the use of evaporator apparatuses, for example by means of circulatory evaporators or thin-film evaporators, as by filmtruders, or by means of annular disk reactors, which ensure an enlarged phase interface. In certain circumstances, recirculation of the reaction mixture or the use of a loop reactor may be necessary to enlarge the phase interface. Furthermore, the removal of the gas phase may be furthered by the addition of water vapor or inert gas into the liquid phase.

If the degree of polymerization is sufficient, then the polymer melt obtained can be discharged from the second stage, for example by means of a gear pump, cooled in a waterbath and further processed in subsequent process steps known to one skilled in the art, for example by extrusion, extraction, pigmenting, tempering.

In a possible embodiment of the second process step, the pressure corresponds to the equilibrium vapor pressure of water at the preselected temperature, so that water separation from the reaction mixture is possible over a finite period of for example 100 minutes. High degrees of polymerization or product viscosities, however, then require a further, third stage enabling an effective condensation of the reaction mixture at low pressures.

(3) The removal of the resulting water of condensation is effected in the third step similarly to the second step by the use of stirred or unstirred separating tanks or tank batteries and by the use of evaporator apparatuses, for example by circulatory evaporators or by thin-film evaporators, as by filmtruders, or by annular disk reactors, which ensure an enlarged phase interface. In certain circumstances recirculation of the reaction mixture or use of a loop reactor may be necessary to enlarge the phase interface. Furthermore, the removal of water can be furthered by the addition of inert gas into the liquid and the gaseous phase. The reaction temperatures are preferably set in the range from 250 to 310° C., particularly preferably from 270 to 290° C., and the reaction pressure preferably less than 2 bar.

The above-described process may be preceded by the steps of:
(a) mixing of the hydrogenation mixture of hexamethylenediamine and aminocapronitrile with water and subsequent conversion at a temperature in the range from 90 to 400° C. and a pressure in the range from 0.1 to $15 \times 10^6$ Pa,
(b) further conversion of the conversion mixture of step (a) at a temperature in the range from 200 to 350° C. and a pressure which is lower than the pressure in step (a) and is adjusted so as to obtain a liquid and a gaseous phase, separation of the gaseous phase from the liquid phase,
(c) mixing of the resulting conversion mixture with a dicarboxylic acid to form a reaction mixture and subsequent conversion of the reaction mixture similarly to steps (1), (2) and (3) as described above.

In this other preferred embodiment of the process, the aminocapronitrile-hexamethylenediamine hydrogenation mixture is reacted with water but without the addition of the bifunctional acid in one or two process prestages, and the resulting product mixture is then combined with the desired acids, preferably with adipic acid, and polymerized in the above-described process stages (1)–(3):

1. Prestage (a)

In the first prestage, the hydrogenation mixture is heated with water at a temperature of from 90 to 400° C., preferably of from 180 to 310° C., in particular of from 220 to 270° C., and a pressure of from 0.1 to $15 \times 10^6$ Pa, preferably from 1 to $10 \times 10^6$ Pa, especially from 4 to $9 \times 10^6$ Pa, is set.

According to the invention, water is used in a molar ratio of aminocapronitrile to water in the range from 1:1 to 1:6, particularly preferably from 1:1 to 1:4, most preferably from 1:1 to 1:3, preference being given to the use of water in excess, based on the aminocapronitrile used.

Pressure and temperature are preferably adjusted to each other in such a way that the reaction mixture constitutes a single liquid phase. The preferred embodiment for this single-phase process is a flow tube, if desired packed with the hereinbelow described catalyst material.

In an alternative embodiment of this stage, pressure and temperature can also be adjusted relative to each other so as to obtain a liquid phase and a gaseous phase. In this embodiment, the liquid phase corresponds to the conversion mixture, while the gaseous phase is removed. The gaseous phase, which consists essentially of ammonia and water vapor, is generally removed continuously using a distillation apparatus. Any organic constituents of the distillate which are coremoved in the course of this distillation, predominantly unconverted aminonitrile and hexamethylenediamine, may be wholly or partly recycled into the first prestage and/or into the subsequent stages.

The two-phase procedure is preferably carried out using a pressure which is greater than the vapor pressure of pure water and hexamethylenediamine which is associated with the bulk temperature of the reaction mixture, but less than the equilibrium vapor pressure of ammonia.

A particularly preferred embodiment of the two-phase procedure utilizes an upright flow tube in which the flow is in the upward direction and which if desired has above the product outlet a further opening for gas phase removal. This tubular reactor may be completely or partially packed with catalyst material, especially catalyst pellets. In a preferred embodiment, the upright reactor used for the two-phase procedure is maximally packed with catalyst material up to the phase boundary.

According to the invention, the aminonitrile-hexamethylenediamine-water mixture is heated using a heat exchanger before being introduced into the first stage. It will be appreciated that the aminonitrile-hexamethylene hydrogenation mixture and the water may also be heated separately from each other and mixed in the first stage using mixing elements.

The residence time of the reaction mixture should generally be set so that it is in the range from 10 minutes to 10 hours, preferably in the range from 30 minutes to 6 hours. There is no restriction with regard to the residence time.

2. Prestage (b)

The second prestage is preferably used when the reaction mixture in the first prestage constitutes a single liquid phase. According to the invention, the conversion mixture obtained in the first prestage is then further converted in prestage 2 at a temperature of from 200 to 350° C., preferably at a temperature in the range from 210 to 300° C., especially in the range from 230 to 270° C., and a pressure which is lower than the pressure in stage 1. Preferably the pressure in the second stage is at least $0.5 \times 10^6$ Pa lower than the pressure in stage 1, and the pressure is generally in the range from 0.1 to $45 \times 10^6$ Pa, preferably in the range from 0.5 to $15 \times 10^6$ Pa, especially in the range from 2 to $6 \times 10^6$ Pa.

Temperature and pressure are selected in stage 2 so as to obtain a gas phase and a liquid phase and to enable the gas phase to be separated from the liquid phase.

The removal of the gas phase may be effected by the use of stirred or unstirred separating tanks or tank batteries and by the use of evaporator apparatuses, for example by means of circulatory evaporators or thin-film evaporators, as by filmtruders, or by means of annular disk reactors, which ensure an enlarged phase interface. In certain circumstances, recirculation of the reaction mixture or the use of a loop reactor may be necessary to enlarge the phase interface. Furthermore, the removal of the gas phase may be furthered by the addition of water vapor or inert gas into the liquid phase.

Preferably the pressure is adjusted at a preselected temperature so that the pressure is below the equilibrium vapor pressure of ammonia, but above the equilibrium vapor pressure of the other components in the reaction mixture at the predetermined temperature. This way, it is possible to favor especially removal of ammonia and thus further speed up the hydrolysis of the acid amide groups.

The preferred residence time for the conversion mixture in stage 2 should be in the range from 10 minutes to 5 hours, preferably in the range from 30 minutes to 3 hours. The residence time is not subject to any restrictions.

The product line between the first and second prestages may contain packing elements such as Raschig rings or Sulzer mixing elements to allow controlled expansion of the conversion mixture into the gas phase. This applies especially to the single-phase procedure of the first stage.

The bifunctional acids such as adipic acid or terephthalic acid which according to the invention are to be used for further conversion are mixed with the conversion mixture from the prestages prior to the subsequent process stages (see above). This may be done using for example static or dynamic mixers which mix the product stream from the prestage with an aqueous adipic acid or terephthalic acid solution. If desired, the acid may also be metered directly to the second prestage, which should be equipped with mixing or stirring elements.

The conversion can be carried out in one or more of the stages in the presence of a metal oxide fixed bed catalyst:

Fixed bed catalysts are preferably used in the reactors of the first prestage and of stage (1). But, if desired, they may also be used in the other process stages. The catalyst-packed reactors are preferably operated with a single liquid phase.

Preference for the purposes of the invention is given to Brönsted acid catalysts selected from a beta-zeolite, sheet-silicate, aluminum oxide or titanium dioxide catalyst. It is also possible to use mixtures of these catalysts. The titanium dioxide catalysts preferably comprise from 70 to 100% by weight of anatase and 0–30% by weight of rutile, wherein up to 40% by weight of the titanium dioxide may be replaced by tungsten oxide. If a very pure aminonitrile is used, the fraction of anatase in the titanium dioxide catalyst should be as high as possible. Preference is given to using a pure anatase catalyst. If the aminonitrile used contains impurities, for example from 1 to 3% by weight of impurities, preference is given to using a titanium dioxide catalyst which contains a mixture of anatase and rutile. Preferably the anatase fraction is from 70 to 80% by weight and the rutile fraction from 20 to 30% by weight. Particular preference is given in this case to a titanium dioxide catalyst comprising about 70% by weight of anatase and about 30% by weight of rutile. The catalyst preferably has a pore volume of from 0.1 to 5 ml/g, particularly preferably from 0.2 to 0.5 ml/g. The average pore diameter is preferably from 0.005 to 0.1 mm, particularly preferably from 0.01 to 0.06 mm. If high viscosity products are used, the average pore diameter should be large. The cutting hardness is preferably above 20 N, particularly preferably >25 N. The BET surface area is preferably above 40 $m^2$/g, particularly preferably above 100 $m^2$/g. If the BET surface area chosen is smaller, then the bulk volume chosen should be correspondingly higher in order that adequate catalyst performance may be ensured. Particularly preferred catalysts have the following properties: 100% anatase; 0.3 ml/g pore volume; 0.02 mm average pore diameter; 32 N cutting hardness; 116 $m^2$/g BET surface area; or 84% by weight anatase; 16% by weight rutile; 0.3 ml/g pore volume; 0.03.mm average -pore diameter; 26 N cutting hardness; 46 $m^2$/g BET surface area. The catalysts may be prepared from commercial powders as available for example from Degussa, Finnti or Kemira. When tungsten oxide is used, up to 40% by weight, preferably up to 30% by weight, particularly preferably from 15 to 25% by weight of the titanium dioxide is replaced by tungsten oxide. The catalysts may be prepared as described in Ertl, Knözinger, Weitkamp: "Handbook of heterogeous catalysis", VCH Weinheim, 1997, pages 98 ff. The catalyst may be used in any desired useful form.

Another preferred catalyst, as well as titanium dioxide (for example VKR 611), contains about 9% of clay, 0.8% of aluminum oxide and about 4% of phosphorus oxide. The catalyst of this composition, formulated in 4 mm extrudates and calcined, is 100% water-resistant and has a cutting hardness of >53 N.

Preferably the catalysts are used in the form of shaped articles, extrudates or pellets, especially pellets. The pellets are preferably sufficiently large to be easy to separate from the product mixture and not to impair the flowability of the product during the conversion. The pellet form of the catalyst makes it possible to remove the catalyst mechanically at the point of exit from the first stage. This may be accomplished by providing mechanical filters or sieves at the point of exit of the process stages which contain the catalyst.

The examples hereinbelow illustrate the invention:

EXAMPLES

Analysis

The relative viscosity (RV), a measure of the molecular weight buildup and the degree of polymerization, is measured in 1% strength by weight solution in the case of extracted material and in 1.1% strength by weight solution in the case of unextracted polymer, in 96% strength sulfuric acid, at 25° C. using an Ubbelohde viscometer. Unextracted polymers are dried under reduced pressure for 20 hours prior to analysis.

For extraction, 100 parts by weight of poly caprolactam are stirred with 400 parts by weight of completely iron-free water at 100° C. for 32 hours under reflux and, after removal of the water, dried gently, i.e., without risk of postcondensation, at 100° C. under reduced pressure for 20 hours.

Process Management

The process examples were carried out in a stirred 1 liter autoclave. In Examples 6 to 10, water is fed continuously into the reaction mixture for a defined interval via the reactor exit.

The compositions of the reactant mixtures and the relative viscosities of the products produced according to the respective processing methods are tabulated.

HAD is hexamethylenediamine, CAN aminocapronitrile and ADA adipic acid.

Example 1

The reactants are introduced into the autoclave, and the autoclave is sealed, de-aired and repeatedly flushed with nitrogen. The mixture in the sealed reactor is then exposed to a reaction temperature of 215° C. for 2 hours. The reaction temperature is subsequently raised to 280° C. and the reactor is opened by means of a control valve to such an extent that the internal pressure adjusts to 18 bar. After a reaction time of 1 hour the pressure in the autoclave is lowered to the ambient pressure of about 5 bar over 30 minutes. The polymer melt is then post condensed at 280° C. for 60 minutes and then extruded into a waterbath, pelleted and dried.

Example 2

The reactants are introduced into the autoclave, and the autoclave is sealed, de-aired and repeatedly flushed with nitrogen. The mixture in the sealed reactor is then exposed to a reaction temperature of 270° C. for 2 hours. The reaction temperature is subsequently raised to 280° C. and the reactor is opened by means of a control valve to such an extent that the internal pressure adjusts to 18 bar. After a reaction time of 1 hour the pressure in the autoclave is lowered to about 5 bar over 30 minutes and subsequently to about 1 bar over 1 hour. The polymer melt is then post condensed at 280° C for 45 minutes and then extruded into a waterbath, pelleted and dried.

Example 3

The reactants are introduced into the autoclave, and the autoclave is sealed, de-aired and repeatedly flushed with nitrogen. The mixture in the sealed reactor is then exposed to a reaction temperature of 215° C. for 2 hours. The reaction temperature is subsequently raised to 280° C. and the reactor is opened by means of a control valve to such an extent that the internal pressure adjusts to 18 bar. After a reaction time of 1 hour the pressure in the autoclave is lowered to about 5 bar over 30 minutes and subsequently to about 1 bar over 1 hour. The polymer melt is then post condensed at 280° C. for 20 minutes and then extruded into a waterbath, pelleted and dried.

Example 4

The reactants are introduced into the autoclave, and the autoclave is sealed, de-aired and repeatedly flushed with nitrogen. The mixture in the sealed reactor is then exposed to a reaction temperature of 215° C. for 2 hours. The reaction temperature is subsequently raised to 280° C. and the reactor is opened by means of a control valve to such an extent that the internal pressure adjusts to 18 bar. After a reaction time of 1 hour the pressure in the autoclave is lowered to about 5 bar over 30 minutes and then to about 1 bar over 1 hour. The polymer melt is then post condensed at 280° C. for 50 minutes and then extruded into a waterbath, pelleted and dried.

Example 5

The reactants are introduced into the autoclave, and the autoclave is sealed, de-aired and repeatedly flushed with nitrogen and then heated. After the reaction temperature of 280° C. has been attained the reactor is opened by means of a control valve to such an extent that the internal-pressure adjusts to 18 bar. After a reaction time of 1 hour the pressure in the autoclave is lowered to about 5 bar over 30 minutes and to about 1 bar over 1 hour. The polymer melt is then post condensed at 280° C. for 15 minutes and then extruded into a waterbath, pelleted and dried.

TABLE 1

| Example | Composition | Relative viscosity |
| --- | --- | --- |
| 1 | 150 g of water<br>84 g of ADA<br>66 g of HMD<br>150 g of ACN | 2.47 |
| 2 | 150 g of water<br>84 g of ADA<br>66 g of HMD<br>150 g of ACN | 2.15 |

TABLE 1-continued

| Example | Composition | Relative viscosity |
| --- | --- | --- |
| 3 | 150 g of water<br>134 g of ADA<br>106 g of HMD<br>60 g of ACN | 2.42 |
| 4 | 150 g of water<br>33 g of ADA<br>27 g of HMD<br>240 g of ACN | 1.88 |
| 5 | 150 g of water<br>84 g of ADA<br>66 g of HMD<br>150 g of ACN | 1.88 |

Example 6

The reactants are introduced into the autoclave, and the autoclave is sealed, de-aired and repeatedly flushed with nitrogen. The reaction mixture in the sealed reactor is then exposed to a reaction temperature of 270° C. for 1 hour. A control valve is opened to adjust the internal reactor pressure to 30 bar over 30 minutes. This is followed by water stripping. A piston pump meters water at a rate of 60 g/h into the reaction mixture. After 2 hours the water stripping is terminated and the pressure. in the autoclave is lowered to 1 bar over 1 hour. The polymer melt is then converted or post condensed for a further two hours at 270° C. and subsequently extruded, pelleted and dried.

Examples 7 to 9

The reactants are introduced into the autoclave, and the autoclave is sealed, de-aired and repeatedly flushed with nitrogen. The reaction mixture in the sealed reactor is then exposed to a reaction temperature of 270° C. for 1 hour. A control valve is opened to adjust the internal reactor pressure to 30 bar over 30 minutes. This is followed by water stripping. A piston pump meters water at a rate of 60 g/h into the reaction mixture. After 2 hours the water stripping is terminated and the pressure in the autoclave is lowered to 1 bar over 1 hour. The polymer melt is then converted or post condensed for one further hour at 270° C. and subsequently extruded, pelleted and dried.

Example 10

The reactants are introduced into the autoclave, and the autoclave is sealed, de-aired and repeatedly flushed with nitrogen. The reaction mixture is then heated up in the sealed reactor. Immediately on attainment of a product temperature of 270° C. a control valve is opened to adjust the internal reactor pressure to 30 bar over 30 minutes. This is followed by water stripping. A piston pump meters water at a rate of 60 g/h into the reaction mixture. After 2 hours the water stripping is terminated and the pressure in the autoclave is lowered to 1 bar over 1 hour. The polymer melt is then converted or post condensed for one further hour at 270° C. and subsequently extruded, pelleted and dried.

TABLE 2

| Example | Composition | Relative viscosity |
| --- | --- | --- |
| 6 | 150 g of $H_2O$<br>33 g of ADA<br>27 g of HMD | 2.61 |

TABLE 2-continued

| Example | Composition | Relative viscosity |
|---|---|---|
| 7 | 240 g of ACN<br>150 g of H$_2$O<br>134 g of ADA<br>106 g of HMD | 3.60 |
| 8 | 60 g of ACN<br>150 g of H$_2$O<br>117 g of ADA<br>93 g of HMD | 2.98 |
| 9 | 90 g of ACN<br>150 g of H$_2$O<br>150 g of ADA<br>120 g of HMD | 3.73 |
| 10 | 30 g of ACN<br>150 g of H$_2$O<br>134 g of ADA<br>106 g of HMD<br>60 g of ACN | 3.52 |

We claim:

1. A process for producing polyamides by
   (i) hydrogenating adiponitrile to form a mixture of 6-aminocapronitrile and hexamethylene diamine in a molar ratio of from 1:99 to 99:1, and
   (ii) reacting the hydrogenation mixture directly obtained from stage (i), with-out further purification steps, with water and a dicarboxylic acid, wherein the amount of dicarboxylic acid is from 50 to 150 mol %, based on the amount of hexamethylene diamine in the mixture.

2. A process as claimed in claim 1, wherein the dicarboxylic acid used is adipic acid or terephthalic acid.

3. A process as claimed in claim 1, wherein the water is used in a molar ratio of from 1:1 to 6:1, based on the 6-aminocapronitrile.

4. A process as claimed in claim 1, comprising the steps of:
   (1) mixing of the hydrogenation mixture of hexamethylenediamine and 6-aminocapronitrile with water and a dicarboxylic acid to form a reaction mixture and subsequent conversion at a temperature in the range from 90 to 300° C. and a pressure at which the reaction mixture constitutes a single liquid phase,
   (2) further conversion of the conversion mixture of step (1) at a temperature in the range of from 230 to 400° C. and a pressure at which a liquid and a gaseous phase are obtained, separation of the gaseous phase from the liquid phase, and
   (3) postcondensation of the product mixture at a temperature of from 250 to 310° C. and a pressure which is lower than the pressure in step (2).

5. A process as claimed in claim 1, comprising the steps of
   (a) mixing of the hydrogenation mixture of hexamethylenediamine and 6-aminocapronitrile with water and subsequent conversion at a temperature in the range from 90 to 400° C. and a pressure in the range from 0.1 to 15×10$^6$ Pa,
   (b) further conversion of the conversion mixture of step (a) at a temperature in the range from 200 to 350° C. and a pressure which is lower than the pressure in step (a) and is adjusted so as to obtain a liquid and a gaseous phase, separation of the gaseous phase from the liquid phase,
   (c) mixing of the resulting conversion mixture with a dicarboxylic acid to form a reaction mixture and subsequent conversion of the reaction mixture as in steps (1), (2) and (3).

6. A process as claimed in claim 1, wherein in the conversion is performed in the presence of a metal oxide fixed bed catalyst in one or more of the steps.

7. A process as claimed in claim 6, wherein the catalyst is selected from beta-zeolite, sheet-silicate, aluminum oxide or titanium dioxide catalysts.

\* \* \* \* \*

UNITED STATES PATENT AND TRADEMARK OFFICE
CERTIFICATE OF CORRECTION

PATENT NO.     : 6,569,988 B1
DATED          : May 27, 2003
INVENTOR(S)    : Mohrschladt et al.

It is certified that error appears in the above-identified patent and that said Letters Patent is hereby corrected as shown below:

Column 9,
Line 26, "with-out" should be -- without --;
Line 27, delete "a".

Column 10,
Line 32, "wherein in the" should be -- wherein the --.

Signed and Sealed this

Twenty-second Day of July, 2003

JAMES E. ROGAN
*Director of the United States Patent and Trademark Office*